United States Patent
Zhao et al.

(10) Patent No.: US 8,700,307 B1
(45) Date of Patent: Apr. 15, 2014

(54) METHOD FOR DETERMINING TRAJECTORIES MANIPULATORS TO AVOID OBSTACLES

(71) Applicant: Mitsubishi Electic Research Laboratories, Inc., Cambridge, MA (US)

(72) Inventors: Yiming Zhao, Somerville, MA (US); Yebin Wang, Acton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/783,477

(22) Filed: Mar. 4, 2013

(51) Int. Cl.
    *G06F 17/10* (2006.01)
(52) U.S. Cl.
    USPC .......................................................... 701/301
(58) Field of Classification Search
    USPC ................................ 701/1, 25, 300, 301, 302
    See application file for complete search history.

(56) References Cited

U.S. PATENT DOCUMENTS

| 6,216,058 B1* | 4/2001 | Hosek et al. ................... 700/245 |
| 7,248,952 B2* | 7/2007 | Ma et al. ........................ 701/25 |
| 2013/0119916 A1* | 5/2013 | Wang et al. ................... 318/600 |

* cited by examiner

*Primary Examiner* — Kim T Nguyen
(74) *Attorney, Agent, or Firm* — Gene Vinokur; Dirk Brinkman

(57) ABSTRACT

A method optimizes a trajectory for a motion of a manipulator avoiding at least one obstacle. The method determines a cost function representing the motion of the manipulator from an initial position to a final position, wherein an optimization of the cost function is subject to spatial non-convex constraints due to avoidance of a region of the obstacle located between the initial position and the final position; and selects a set of locations on the trajectory representing positions of the manipulator at different times. Next, for each location in the set of locations, at least one linear convex constraint defining an interval of values for a projection of a position of the location on an axis of a direction of the motion of the manipulator is determined to produce a set of linear convex constraints and the cost function is optimized subject to the set of linear convex constraints.

11 Claims, 13 Drawing Sheets

500

600

700

METHOD FOR DETERMINING TRAJECTORIES MANIPULATORS TO AVOID OBSTACLES

FIELD OF THE INVENTION

This invention relates generally to trajectory planning method, and more particularly to a method for determining a trajectory for a motion of a manipulator to avoid an obstacle.

BACKGROUND OF THE INVENTION

Planning of the motion of a manipulator is generally performed in two steps: trajectory planning and motion planning. Collision-free trajectory planning is typically solved by decomposing the problem into two steps. First, only the geometric aspects of the manipulator, including the collision avoidance constraint, are considered. Next, the planning accounts for other constraints, such as the constraints on system dynamics. After the trajectory is determined, a speed profile can be assigned to the trajectory to determine the motion of the manipulator. Such decomposition can be computationally efficient. However, that approach can fail to find a feasible trajectory when the geometric path is not properly generated. Also, this approach does not ensure an optimal trajectory.

The planning of an optimal trajectory of a manipulator avoiding obstacles while minimizing energy consumption of the manipulator in the field of robotics is difficult. This is because the requirement of avoiding obstacles leads to a set of non-convex constraints and the optimization of continuous-time dynamical systems for the set of non-convex constraint is a difficult problem to solve.

Several conventional methods optimize energy efficiency during the path planning step by associating geometry, e.g., curvature of the trajectory with energy consumption. Some methods consider the energy-efficient path planning problem in terms of the friction and gravity, but assume the manipulator moves at a constant speed. Results on the energy optimal motion planning are limited, and some methods focus on time-optimality and smoothness of the trajectory, see, e.g., U.S. Pat. No. 6,216,058.

The non-convex constraints due to obstacle avoidance need to be enforced during trajectory generation and optimization. Several conventional methods formulate the trajectory planning with obstacle avoidance as an optimization problem. For example, the method described in U.S. Pat. No. 7,248,952 formulates the trajectory planning as a mixed integer linear programming problem. However, the computation of a mixed integer problem is time consuming. Another method, described by Hagenaars et al, in "Approximate continuous-time optimal control in obstacle avoidance by time/space discretization of non-convex state constraints," Proc. of the 2004 IEEE Int. Conf. on Control Applications pp. 878-883, 2004, considers optimal control with obstacles by discretization of time and space. However, the cost function of the state and control variables is convex.

Some methods determine a suboptimal trajectory planning by minimizing influence of the non-convex constraints. For example, a method described by Duleha et al., in "Nonholonomic motion planning based on newton algorithm with energy optimization," IEEE Transactions on Control System Technology, Vol: 11(3), pp. 355-363, May 2003, considers energy efficient trajectory planning for non-holonomic systems without obstacles. Yet another method described by Mei et al., in "Energy-efficient motion planning for mobile robots," In Proc. of IEEE Int. Cone on Robotics and Automation, pp. 4344-4349, 2004, considers the energy efficient motion planning for a mobile robot which has to visit several locations. The robot is assumed to move at certain pattern, thus simplifying the energy optimal trajectory planning problem by ignoring the dynamics of robots. However, all those methods do not take obstacles into account.

Accordingly, there is a need for optimization of a trajectory of a motion of a manipulator avoiding at least one obstacle, wherein the optimization is subject to spatial non-convex constraints due to the obstacle.

SUMMARY OF THE INVENTION

It is an object of some embodiments of an invention to provide a method for optimization of a trajectory of a motion of a manipulator avoiding at least one obstacle, wherein the optimization is subject to spatial non-convex constraints due to the obstacle. It is further object of some embodiments to provide such method that optimizes a cost function representing the motion of the manipulator subject to non-convex constraint. It is a further object of some embodiments to provide such method that optimizes the cost function representing energy efficient motion of the manipulator.

Various embodiments of the invention are based on a realization that spatial non-convex constraints of the entire trajectory can be locally convex for specific locations on the trajectory. Accordingly, some embodiments transform the spatial non-convex constraints of the trajectory into a set of convex constraints of the set of locations. In one embodiment, the convex constraints are linear convex constraints. For example, instead of determining the non-convex constraints for the entire trajectory, each linear convex constraint is determined for a location on the trajectory and defines an inter val of values for a projection of a position of the location on a coordinate axis. The set of locations on the trajectory can represent positions of the manipulator at different times, and the coordinate axis can correspond to an axis of a direction of the motion of the manipulator. Accordingly, instead of optimizing the trajectory subject to spatial non-convex constraints, various embodiments optimize the trajectory subject to the set of convex constraints, e.g., linear convex constraints.

In effect, this realization allows decoupling constraints of the manipulator along the directions of the motion. Thus, the trajectory can be jointly optimized under locally imposed convex constraints for each location and for each direction. For example, in one embodiment, the trajectory is initialized, and for each location on the trajectory the linear convex constraints for each direction of the motion of the manipulator is defined. Next, the trajectory is jointly optimized for all locations. In one embodiment, the optimization is based on alternation of directionality of the optimization, i.e., motion along one direction is fixed while motion along another direction is optimized. In another embodiment, the alternation is based on the locality, i.e., the motions of non-local locations are fixed, while the motion of the local locations is optimized.

Various embodiments reduce complexity of the non-convex optimization problem. In addition, the embodiments reduce and simplify a size of the optimization. Specifically, the size of the optimization problem solved by the embodiments is determined only by the number of locations used to represent the trajectory, and is not affected by the complexity of the working environment of the manipulator, such as the geometry, number and distribution of obstacles. This is advantageous as compared with some other methods, where the complexity of the optimization problem is proportional to the difficulty of the working environment.

Accordingly, one embodiment discloses a method for optimizing a trajectory for a motion of a manipulator avoiding at least one obstacle. The method includes determining a cost function representing the motion of the manipulator from an initial position to a final position, wherein an optimization of the cost function is subject to spatial non-convex constraints due to avoidance of a region of the obstacle located between the initial position and the final position; selecting a set of locations on the trajectory representing positions of the manipulator at different times; determining, for each location in the set of locations, at least one linear convex constraint defining an interval of values for a projection of a position of the location on an axis of a direction of the motion of the manipulator to produce a set of linear convex constraints; and optimizing the cost function subject to the set of linear convex constraints to optimize the trajectory. Steps of the method can be performed by a processor.

Another embodiment discloses a system for determining a trajectory for a motion of a manipulator avoiding at least one obstacle. The system includes a processor for initializing the trajectory with a collision-free initial trajectory, selecting a set of locations on the trajectory representing positions of the manipulator at different times; determining, for each location in the set of locations, a locally convex constraint to produce a set of locally convex constraints; and optimizing a cost function representing the motion of the manipulator subject to the set of locally convex constraints to optimize the trajectory.

DETAILED DESCRIPTION OF THE PREFERRED EMBODIMENT

Figure 1A:
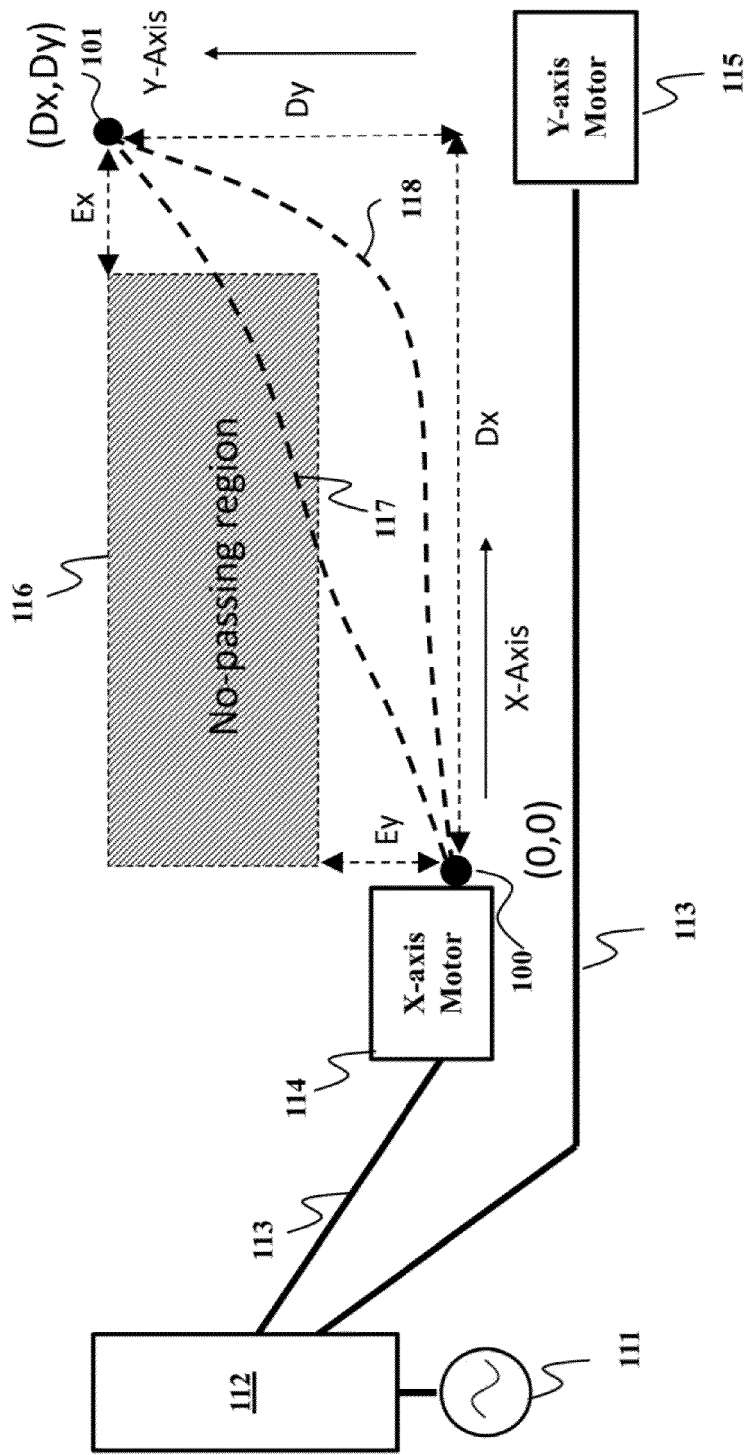
FIG. 1A is a schematic of manipulator moving from an initial location, to a final location.

FIG. 1A shows a schematic of manipulator moving from the initial location 100, whose coordinate in the 2D plane is (0,0), to the final location 101, whose coordinate in the 2D plane is (Dx, Dy). A power source 111 provides electrical energy to an inverter 112. The inverter provides electricity to actuators, e.g., servomotors 114 and 115 which drives the manipulator to move in x and y axis respectively. The electricity from the inverter to the servomotors is transferred through power line 113. An obstacle forms no-passing region 116 for the manipulator. Trajectory 117 is not acceptable or feasible because the trajectory 117 because the manipulator to collide with the obstacle. On the other hand, a trajectory 108 is acceptable or feasible. Some embodiments of the invention describe a method for optimizing a trajectory for a motion of a manipulator avoiding at least one obstacle.

Figure 1B:
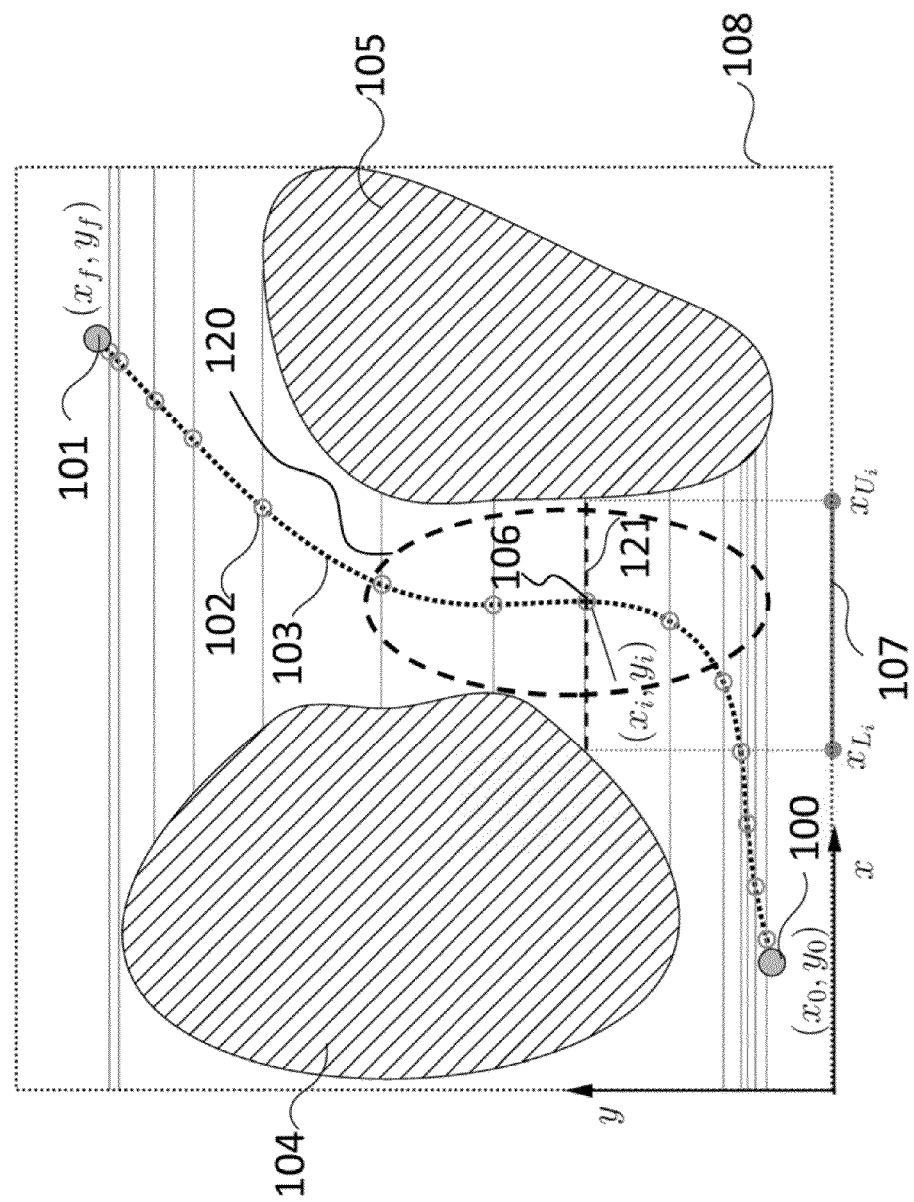
FIG. 1B is a schematic of a realization behind some embodiments of the invention.

FIG. 1B illustrates a realization behind some embodiments of the invention. In this example, the obstacles are defined by no-passing regions 104 and 105. A trajectory 103 is an instance of collision-free trajectories. The trajectory 103 can be initialized using various techniques. Small circles such as 102 are selected locations along the trajectory representing the position of the manipulator at different times. A region 108 represents the range of operation of the manipulator. The geometry of the region 108 can be arbitrary.

Various embodiments of the invention are based on a realization that spatial non-convex constraints of the entire trajectory can be approximated by locally convex constraints. For the manipulator of FIG. 1A, the x and the y directions are separated, i.e., changing motion in the x direction does not produce any change of motion in the y direction, and vice versa. In one embodiment, actuators for the motions of the manipulator along different axis are planned separately and locally.

Each convex, constraint is determined for a location on the trajectory, e.g., location 106, and defines a corresponding interval 107 of values for a projection of a position of the location on a coordinate axis. In another embodiment, the local motion of the system at location 106 is constraint to the convex region 120 instead of the original non-convex collision avoidance constraint.

FIG. 1B illustrates an example for trajectory planning in a plane, when the motion in the y direction is fixed, and the motion in the x direction needs to be optimized. Because the y motion is fixed, the y coordinate $y_i$ of the location 106 with current coordinates $(x_i, y_i)$ cannot change. In this example, the x motion of the location 106 must satisfy the obstacle avoidance constraint, thus the motion of the location in x direction is limited to the short horizontal segment 121, which passes the location 106 and is bounded between two obstacles A104 and A105. Correspondingly, the x coordinate, $x_i$, must stay in the interval 107, or $(x_{Li}, x_{Ui})$, which is the projection of the segment 121 on the x axis. Therefore, during the planning of the motion along the x axis, the obstacle avoidance constraint is enforced locally at xi as $x_{Li} \leq x_i \leq x_{Ui}$, which is a convex constraint on $x_i$. By performing the same operation for each of the selected locations, the obstacle avoidance constraint is converted into convex constraint in the motion planning for the x-motion.

After the motion in the x direction is optimized, the steps of the method can be performed reversely, i.e., fixing the x motion, and optimize the y motion. The overall trajectory is obtained by combining the x motion and y motion, and is guaranteed to satisfy the obstacle avoidance constraint.

Figure 1C:
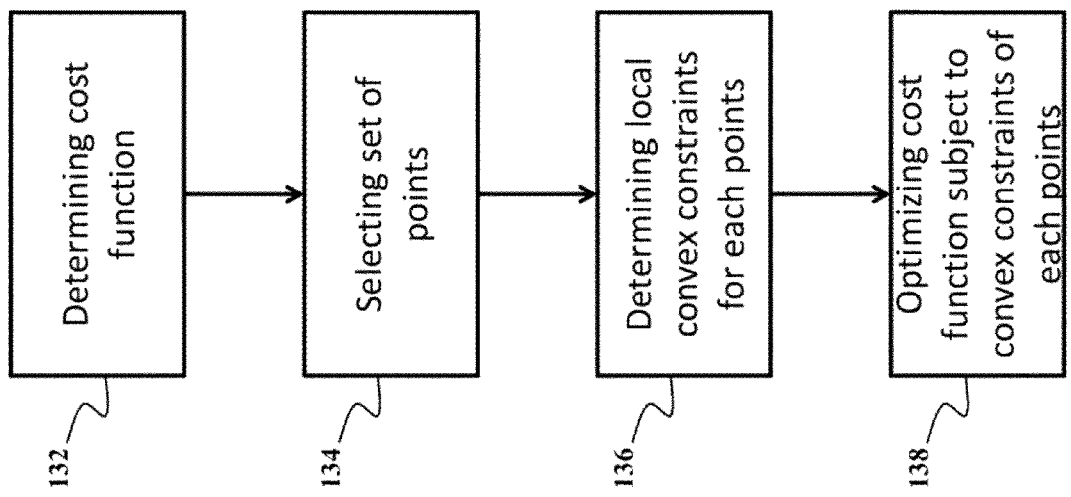
FIG. 1C is a block diagram of a method for optimizing a trajectory for a motion of a manipulator avoiding at least one obstacle according to one embodiment of the invention.

FIG. 1C shows a block diagram of a method for optimizing a trajectory for a motion of a manipulator avoiding at least one obstacle. Steps of the method can be implemented using a processor. The method determines 132 a cost function representing the motion of the manipulator from an initial position to a final position, wherein an optimization of the cost function is subject to spatial non-convex constraints due to avoidance of a region of the obstacle located between the initial position and the final position. Next, a set of locations representing positions of the manipulator at different times is selected 134. For example, the set of locations can be determined on an initialized trajectory.

For each location in the set of locations, local convex constraints are determined 136 to produce a set of local convex constraints. For example, some embodiments determined at least one linear convex constraint defining an interval of values for a projection of a position of the location on an axis of a direction of the motion of the manipulator. In this embodiment, the set of local convex constraints includes a set of linear convex constraints. Next, the cost function is optimized 138 subject to the set of convex constraints. The optimization of the cost function optimizes the trajectory of the manipulator.

Such optimization technique allows reducing optimization subject to non-convex constraints to the optimization subject to a set of convex constraints. In some of the embodiments using linear convex constraints, the cost function is optimized separately for different directions, which can be the directions of the independent motions of the manipulator. In such manner, the trajectory of the manipulator is optimized for different directions separately, and the optimal trajectory of the manipulator is determined by combining the optimal trajectories in all directions. Those embodiments reduce non-convex constraints to the convex constraints by reducing dimensionality of the non-convex constraints.

Figure 2A:
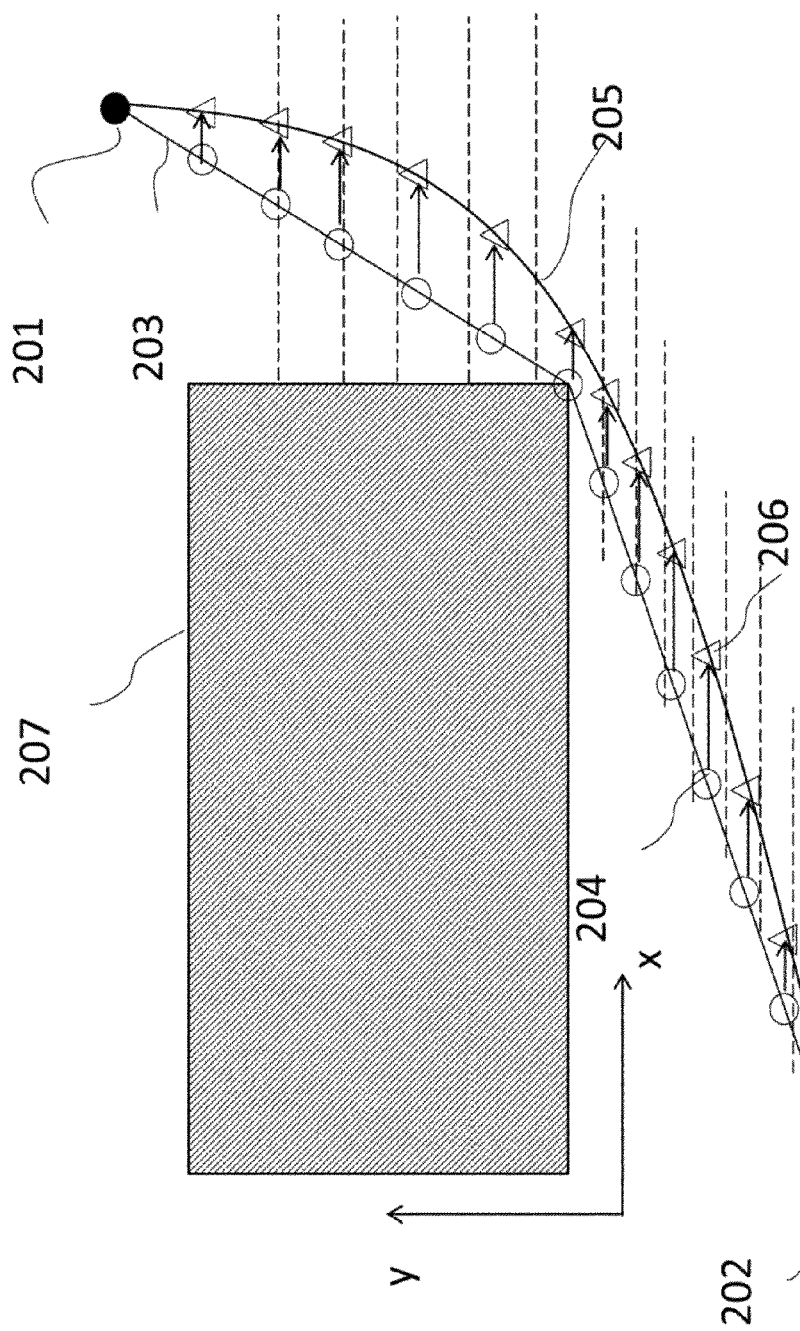
FIGS. 2A and 2B are schematics of an exemplar embodiment, wherein an optimization of the motion of the system in the x [sloppy] direction is followed by an optimization of the motion in the y direction for an obstacle avoidance trajectory planning problem in the x-y plane.
Figure 2B:
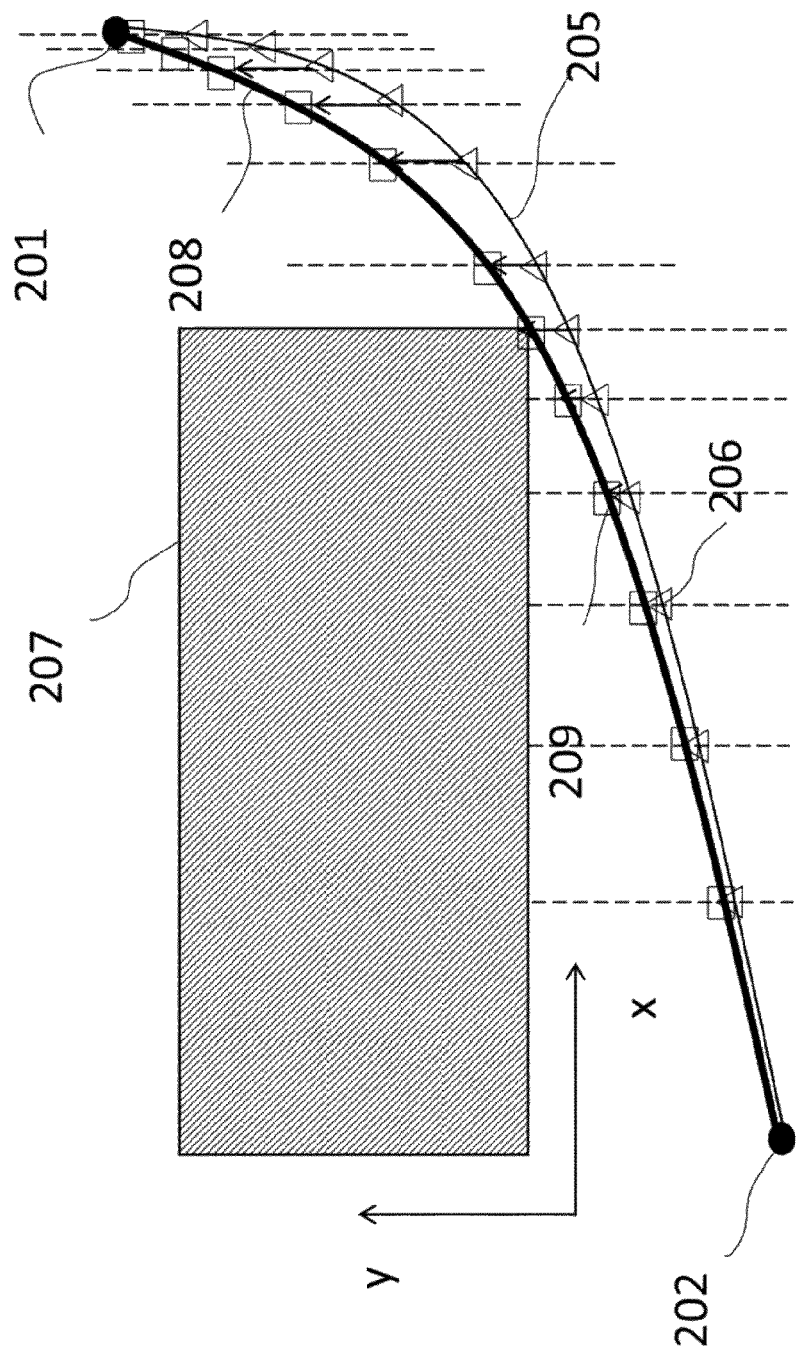

FIGS. 2A and 2B illustrate an exemplar embodiment, wherein an optimization the motion of the system in the x direction is followed by an optimization of the motion in the y direction for an obstacle avoidance trajectory planning problem in the x-y plane. These two optimizations are conceptually shown in FIGS. 2A and 2B, respectively.

In FIG. 2A, a location 201 is the initial position of the trajectory, and a location 202 is the final posit ion of the trajectory. The line 203, which is a zigzag line connecting the location 201 and the location 202, is the initial trajectory. A region 207 is an obstacle in the environment. The circles along trajectory 203, which include locations 204, are the set of locations selected along the trajectory. When the x motion is optimized, because the y motion is fixed, these locations marked by circles can only move along the dashed lines perpendicular to the y axis. Furthermore, the ranges of the movements of these locations along the dashed lines are determined by the requirement of obstacle avoidance, and are convex. The optimal location of this set of locations are then determined by solving an optimization problem, and are marked by triangles, including location 206, along the trajectory 205 with optimized motion in the x direction. The optimal speed of the system at each of these triangles can also be determined while solving the same optimization problem. The trajectory 205 has better performance in the x-motion than trajectory 204 due to the optimization, while having the same performance in the y-motion as 204 since the y-motion is not changed.

FIG. 2B illustrates the optimization of the y-motion following the x-motion optimization shown in FIG. 2A. In FIG. 2B, the small squares, including a location 209, are the results of the y-motion optimization of trajectory 205. The new trajectory after the y-motion optimization, 208 improves the performance in the y-motion, and the same performance in the x-motion, as compared to trajectory 205.

Therefore, the trajectory 205 has better performance in both the x-motion and the y-motion than the trajectory 203, which is used to initialize the method.

Figure 3:
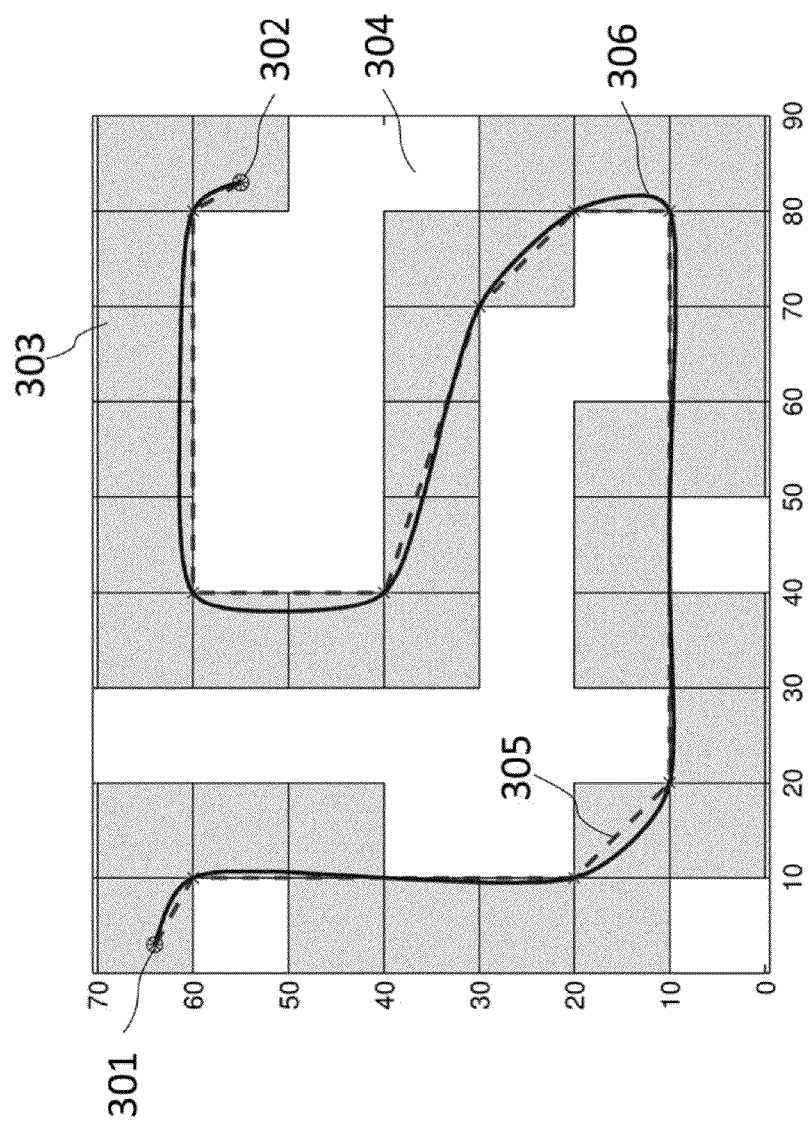
FIG. 3 is a schematic of simulation result of obstacle avoidance trajectory optimization according to one embodiment.

FIG. 3 shows the numerical simulation result of obstacle avoidance trajectory optimization according to one embodiment. The manipulation system considered in this example has a double integrator type of dynamics, which common in multi-axis machines. The cost function for optimization is the energy consumption of the system. The system works in a complex environment such that its motion is limited in the grey region 303, which is marked by connected squares. The white region 304 represents the obstacle, which cannot be along trajectory. Locations 301 and 302 are the initial and final positions of the system, respectively. The dashed line 305 is the trajectory used to initialize the optimization method, and the smooth trajectory 306 is the optimal trajectory obtained by optimizing the energy consumption using the proposed method.

Consider a two-dimensional optimal motion planning task in the x-y plane, which can be mathematically formulated in the following form:

$$\min J(X,Y)$$

$$F_x(X) \leq 0, F_y(Y) \leq 0, C(X,Y) \in D$$

where X and Y define the motions components along the x and y directions, respectively. In particular, x includes the x coordinate and speed component along the x direction at selected locations along the trajectory of the system. X also includes the control inputs associated with the actuators for the motion in the x direction. The motion component Y has contents similar to X. $J(X,Y)$ is a function to be minimized for the improvement of system performance. $F_x(X) \leq 0$ includes constraints for the motion in the x direction, and $F_y(Y) \leq 0$ includes constraints for the motion in the y direction. $C(X,Y) \in D$ describes the collision avoidance constraint. In particular, D is the obstacle free region, i.e. the feasible region, for the motion planning task. $C(X,Y)$ determines the position of locations along the trajectory based on motion components X and Y.

In one embodiment, the optimization of the initial trajectory includes the following steps:

1) Select the time grid, and generate the initial trajectory, which is represented by motion components $X_c$ and $Y_c$ defined on the selected time grid.
2) Solve the following motion planning problem, which optimizes the motion in the x direction, while keeping the y motion invariant:

$$\min J(X,Y_C)$$

$$F_x(X) \leq 0, C(X,Y_C) \in I)$$

where $C(X,Y_c) \in D$ is convex with respect to X, and obtain the optimization result X*, where min is a function that returns . . . , and * indicates optimality.
3) Solve the following motion planning problem, which optimizes the motion in the y direction while keeping the x motion invariant:

$$\min J(X^*,Y)$$

$$F_y(Y) \leq 0, C(X^*,Y) \in D$$

where $C(X^*,Y) \in D$ is convex with respect to Y, and obtain the optimization result Y*
4) If better accuracy and optimality are desired, regenerate the time grid, and the initial trajectory based on the optimization result (X*, Y*), and repeat steps 2), 3), 4). Otherwise, return the optimal motion planning result (X*, Y*).

The trajectory 306 is relatively easy to execute because the control inputs required for tracking the trajectory has fewer spikes, i.e., changes more slowly, than trajectories generated using other methods, such as time-optimal trajectories, or trajectories obtained by relaxing the travel time of time optimal trajectories. This means that the trajectories determined by the embodiments require a lower bandwidth of the actuators, because the actuators can track such trajectories more effectively.

Figure 4:
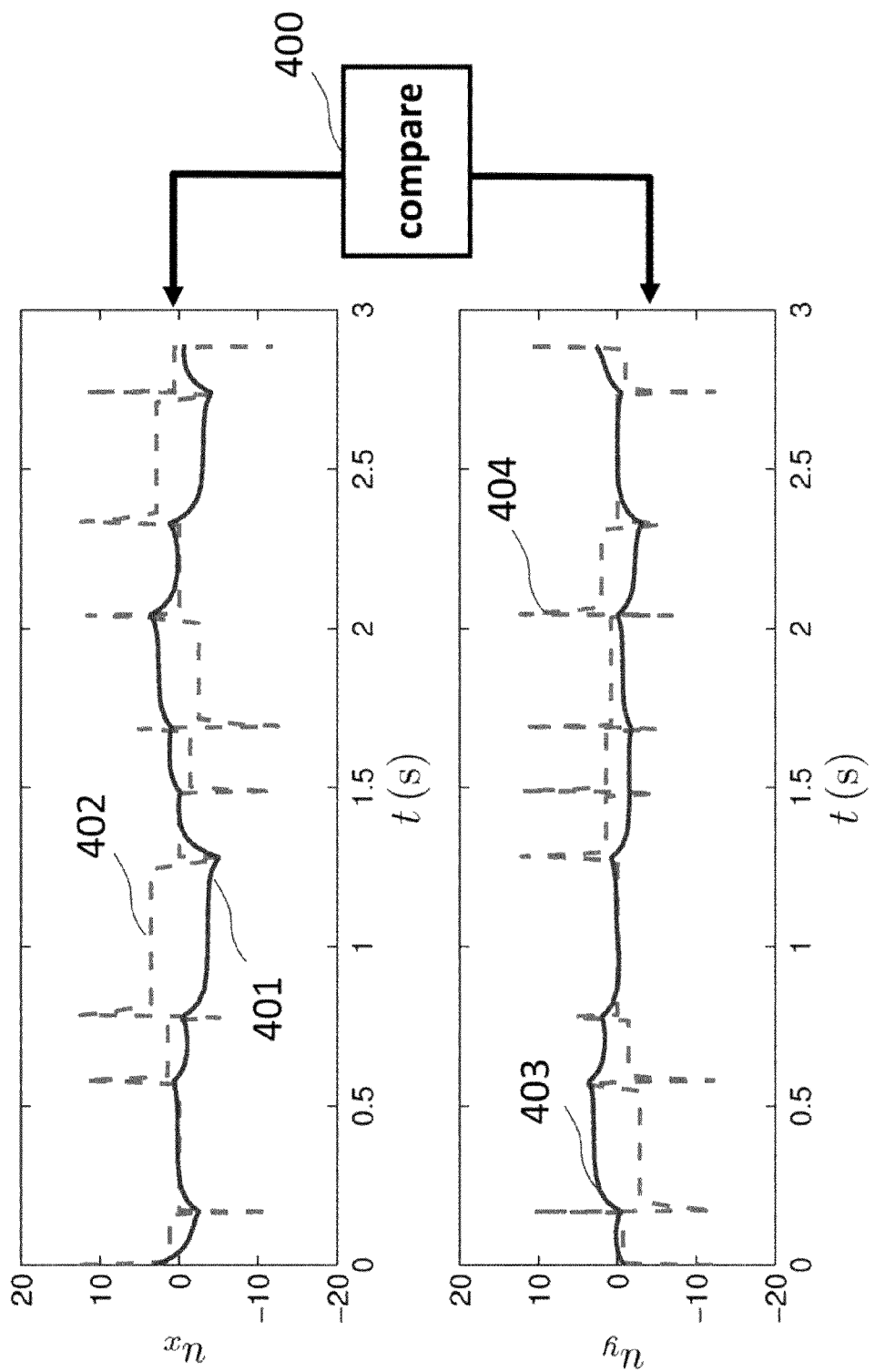
FIG. 4 are graphs comparing the control inputs required for tracking two trajectories shown in FIG. 3.

FIG. 4 shows graphs comparing 400 the control inputs required for tracking two trajectories shown in FIG. 3. The control inputs 401 and 403 are associated with the trajectory generated according to the embodiments of the invention and are much smoother than controls 402 and 404 determined by relaxation of time-optimal trajectories method. Furthermore, the maximum absolute value of control inputs 401 and 403 is also smaller, which also helps with the tracking task. For this example, the trajectory generated using the disclosed method requires 24.8% energy to track than the other trajectory for comparison.

Figure 5:
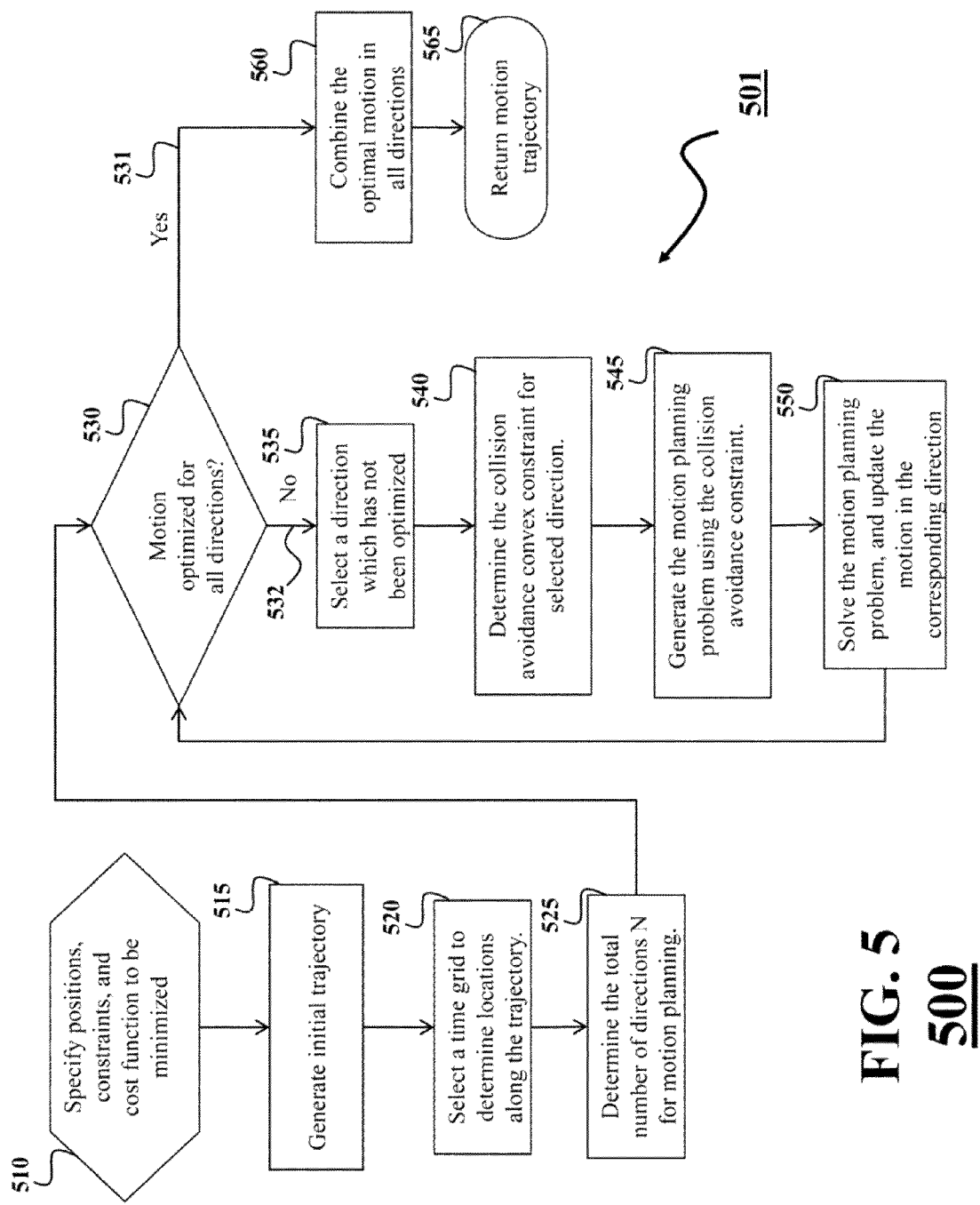
FIG. 5 is a flowchart of a method for optimizing a trajectory for a motion of a manipulator avoiding at least one obstacle according to an embodiment of the invention.

FIG. 5 shows a flowchart of a method 500 for optimizing a trajectory for a motion of a manipulator avoiding at least one obstacle according to an embodiment, of the invention. The method can be implemented using a processor 501.

Usually, the initial and final positions of the manipulator and various parameters and constraints of the operation of the manipulator are provided 510 in advance. Using these data, a cost function representing the motion of the manipulator from an initial position to a final position is determined 510. The optimization of the cost function is subject to spatial non-convex constraints due to avoidance of a region of the obstacle located between the initial position and the final position.

In some embodiments, an initial trajectory is generated 515. For example, the trajectory is initialized with a collision-free initial trajectory. Such initialization guaranties feasibility of the solution of the minimization of the cost function and can improve the speed of computation. In some embodiments, the trajectory is initialized by minimizing simpler cost function than the cost function determined in 510. For example, one embodiment determines a cost function representing the motion of the manipulator from an initial position to a final position within a time of operation, and minimizes the cost function to produce the initial trajectory minimizing time of the operation. The cost function of the time of the operation can be simpler than the cost function of, e.g., the energy consumption of the manipulator, but provides good initial trajectory for subsequent more complex optimization.

Next, a set of locations on the trajectory representing positions of the manipulator at different times is selected 520. Some embodiments select first a time grid specifying a density of the locations, and select the set of locations according to that time grid. In some embodiments, the optimization is performed iteratively for different set locations on the trajectory. For example, one embodiment, after at least the first round of the optimization, changes the time grid, updates the set of locations on the optimized trajectory for different positions of the manipulator, and some steps of the optimization. The set of locations on the trajectory can be arbitrarily. However, some embodiments adjust the locations associated with time instances to improve the optimality of the trajectory.

Some embodiments of the invention determine local convex constraints for each location. Additionally or alternatively, some embodiment determines linear convex constraints for various directions of the motion. In those embodiments, the total number of directions N for decoupled motion planning is determined 525, and the motion, i.e., the trajectory of the motion is optimized separately for all directions 530 until the motion in all direction is optimized 531.

For each direction of the motion 532 to be optimized, a linear convex constraint defining an interval of values for a projection of a position of the location on an axis of the direction of the motion of the manipulator is determined 540 for each location in the set of locations producing a set of linear convex constraints. Thus, the motion planning problem for generating an optima trajectory in all direction subject to convex constraints is reduced 545 to the planning problem for optimizing the trajectory using the linear convex constraints avoiding collision with the obstacle in the direction of the motion. Next, the motion panning problem is solved 550 by optimizing the cost function subject to the set of linear convex constraints to optimize the trajectory.

If the trajectory of the motion is optimized for all directions 531 then the optimizations of the trajectory for all directions are combined 560 to produce 565 the optimal trajectory. Otherwise 532, the trajectory is optimized for different direction.

A number of variations of the above method are possible and within the scope of the invention. For example, one embodiment performs optimization iteratively, i.e., multiple times for each direction, until a termination condition is satisfied. This embodiment can improve the optimality of trajectories for some type of the constraints. Another embodiment determines a set of collision-free initial trajectories, optimize each initial trajectory subject to a corresponding set of the linear convex constraints to produce a set of optimal trajectories, and select a global optimal trajectory from the set of optimal trajectories. This embodiment can improve global optimaliity of the trajectory and can account for uncertainty caused by determination of the initial trajectory.

Another embodiment is based on a realization that constraints of the working environment of the manipulator can include both convex and non-convex constraints for different regions of the environment. Accordingly, one embodiment decomposes a working environment of the manipulator into separate regions including a convex region with convex constraints and a non-convex region with non-convex constraints. The set of liner convex constraint is determined for the non-convex region only and the cost function is jointly optimized subject to convex constraints of the convex region and the set of liner convex constraints of the non-convex region. This embodiment allows combining strength of different optimization methods.

Energy Efficient Motion Control System Avoiding Obstacles

The optimization of continuous-time dynamical systems under a non-convex constraint set is difficult problem to solve. However, representing the motion of the manipulator as a cost function subject to non-convex constraints allows considering complex energy models. Thus, combining the cost function representing energy efficient motion of the manipulator with the above described optimization solution under non-convex constraint can optimize energy consumption of the manipulator.

Figure 6A:
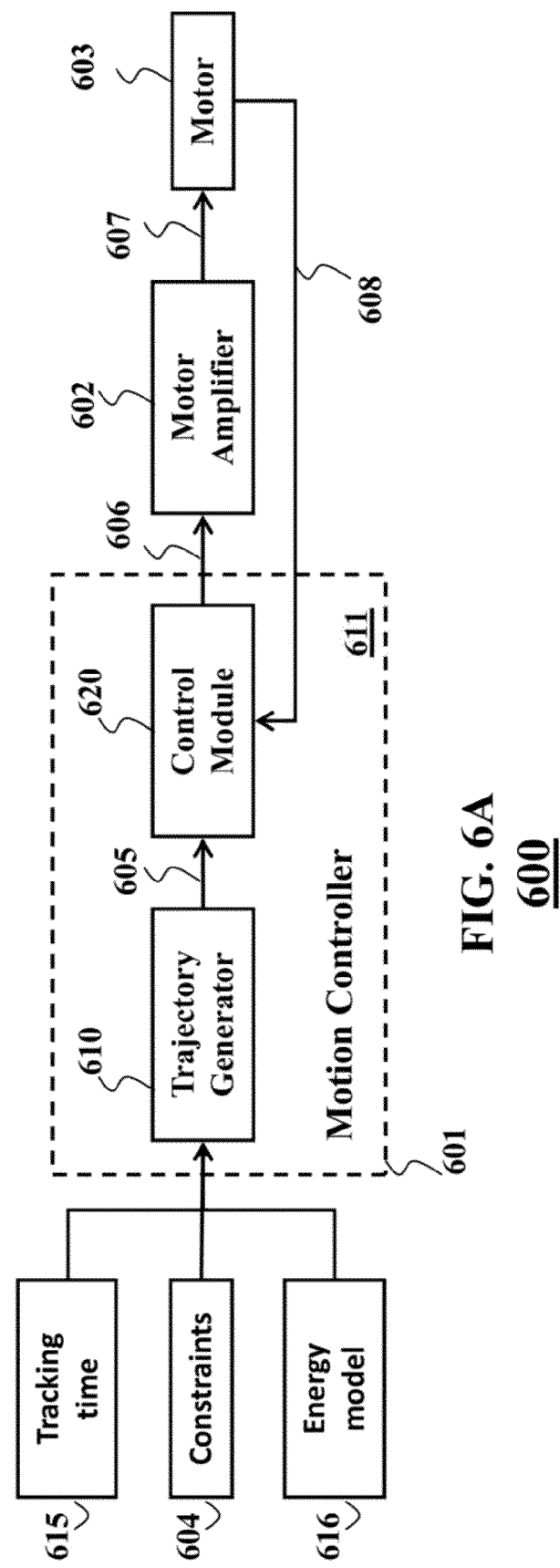
FIGS. 6A, 6B, and 6C are block diagrams of components of a motion control system according to some embodiments of an invention.
Figure 6B:
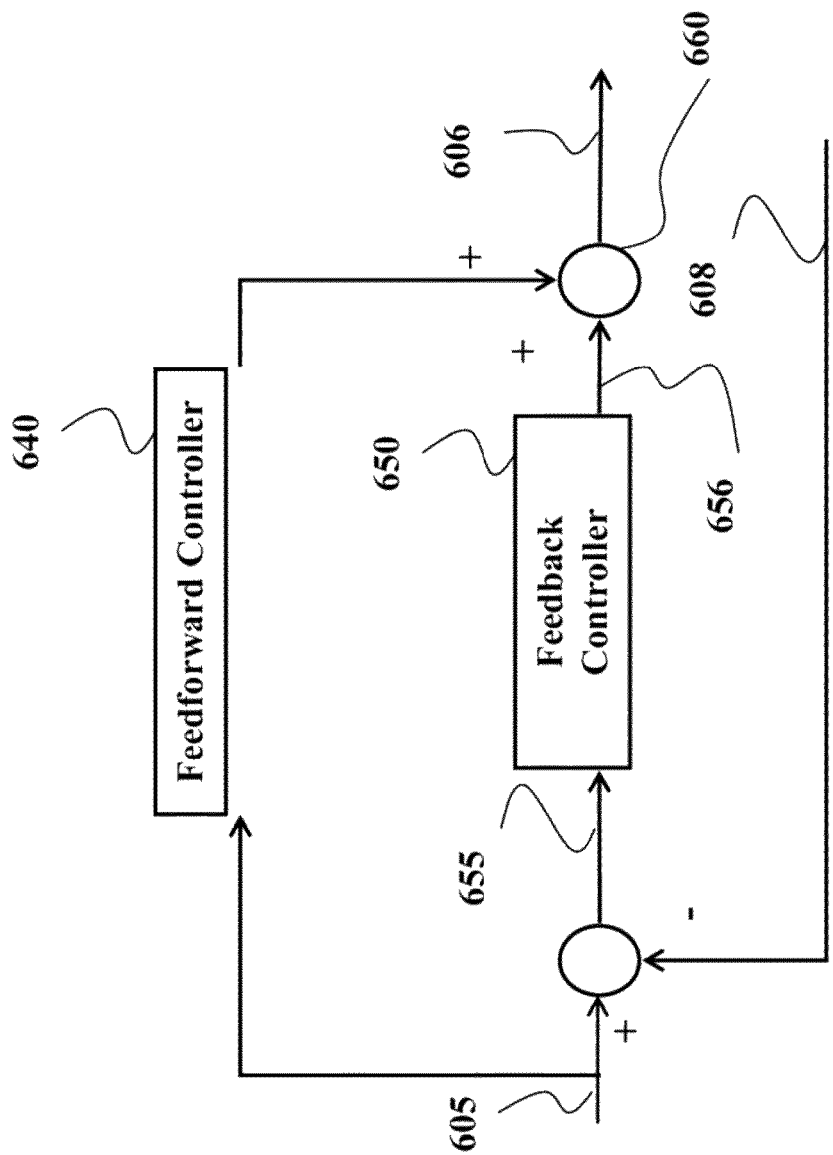
Figure 6C:
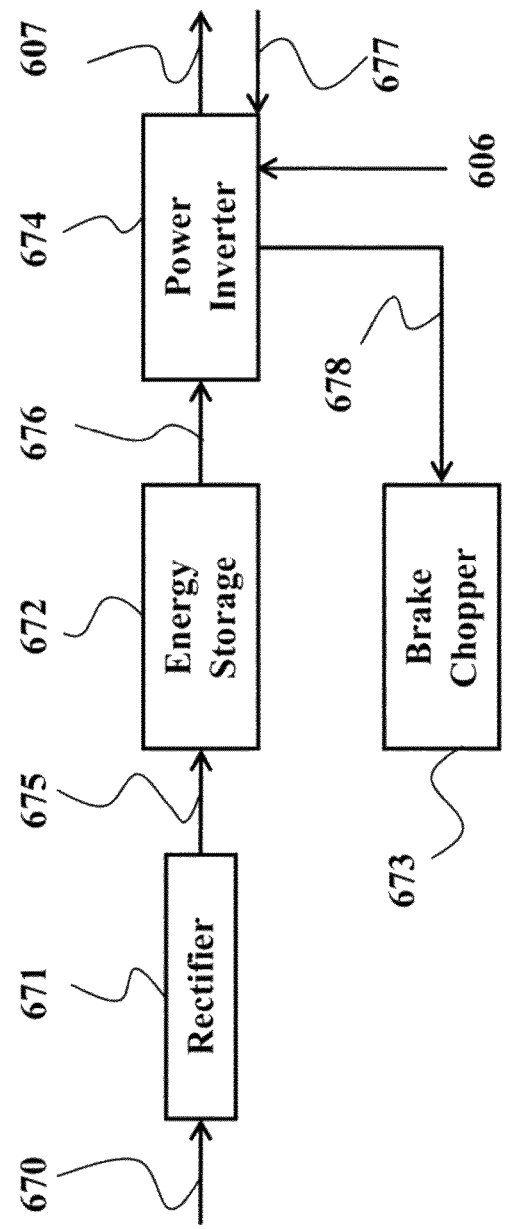

FIGS. 6A, 6B and 6C show block diagrams of a motion control system according to some embodiments of an invention. The motion control system can be configured to perform a single axis positioning task, or a multiple axes positioning tasks. An example of the motion control system is a servo system.

As shown in FIG. 6A, the energy efficient motion control system 600 includes one or combination of a motion controller 601, an amplifier 602, and a motor 603. The motion controller 601 can further include a trajectory generation module 610 and a control module 620. The trajectory generation module 610 receives constraints 604, including non-convex constraints, and the tracking time 615, and energy model 616 as inputs and outputs an energy efficient trajectory 605 of a motion of the motor of the motion control system to the control module 620. The energy efficient trajectory can include one or combination of a control trajectory of a current input to the motor, a position trajectory of a position of the motor, a velocity trajectory of a velocity of the motor, and an acceleration trajectory of an acceleration of the motor. Typically, the control, the position, the velocity, and the acceleration trajectories are equivalent to each other, because, given the initial state of the motor, every trajectory uniquely determines the other three trajectories through the dynamics of the motor. As referred herein, the energy efficient trajectory is one or combinations of abovementioned trajectories.

The trajectory generation module 610 determines the trajectory 605 by minimizing a cost function subject to the constraints 604. The cost function is determined based on an energy model 616 of the system 600 and, optionally, a function of a tracking time 615, as described below. The motion controller can be implemented using a processor 611.

The control module 620 determines a control signal 606 based on the trajectory 605 and feedback signal 608, and outputs the control signal 606 to the amplifier 602 which determines and outputs a current or voltage input 607 to the motor 603. In one embodiment, the feedback signal 608 describes a current state of the motion control system. In another embodiment, the feedback signal 608 describes a motion of the motor 603. For example, in one variation of this embodiment, the feedback signal 608 is a position of the motor. In some embodiments, the control module 620 performs feedforward and/or feedback operation to determine the control signal 606.

FIG. 6B shows a block diagram of the control module 620 according to one embodiment of the invention. The control module 620 includes a feedforward controller 640 and a feedback controller 650. The feedforward controller takes the trajectory 605 as input, and a feedback controller takes an error signal 655 between the feedback signal 608 and the trajectory 605 to determine a correction signal 656. The control signal 606 is determined based on the trajectory 605 and the correction signal 656.

The embodiments shown in FIGS. 6A-6C are used for illustration purpose only, and are not intended to limit the scope of the invention. For example, in various embodiments, the command signal 605 or the control signal 606 are provided directly to the motor 603. In another embodiment, the control module is integrated into the amplifier 602, and the feedback signal 608 is fed into the amplifier.

FIG. 6C shows a block diagram of the amplifier according to one embodiment of the invention. A rectifier 671 rectifies a power supply 670 into DC current 675, which flows through an energy storage block 672. A power inverter 674 receives, from the energy storage block 672, the DC current 676 and generates AC current 607 to drive a motor. When a motor is decelerating, the motor generates energy and provides AC current 677 to the power inverter 674, which redirect the AC current 677 to a brake chopper 673. The brake chopper dissipates the power flow 678 from the power inverter 674. Signals 606 or 605 are used to control the power inverter such that it outputs the required current 607.

Energy Model of the Motion Control System

Figure 7A:
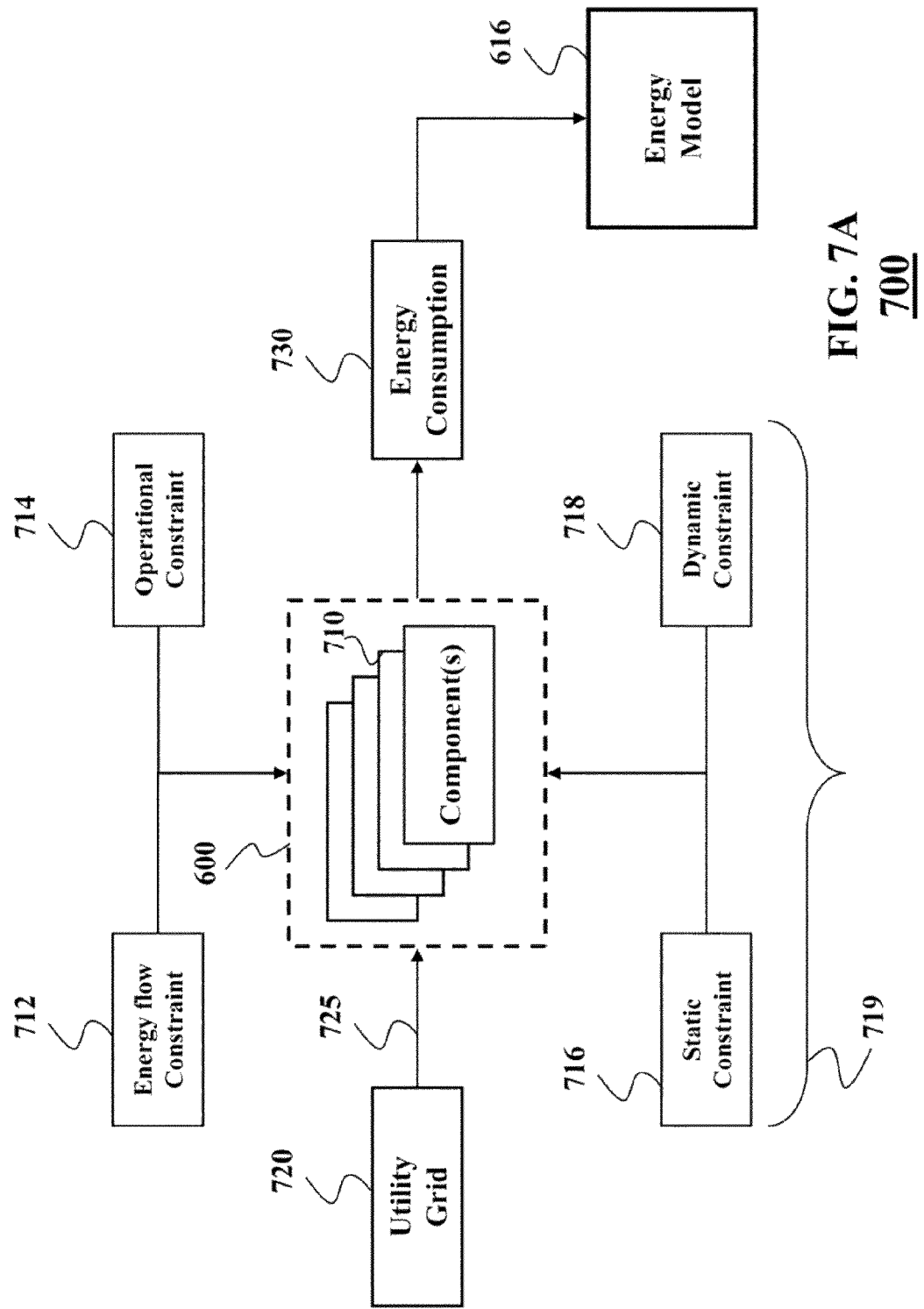
FIGS. 7A and 7B are block diagrams of methods for generating a cost function according to some embodiments of an invention.

FIG. 7A shows a block diagram of a method 700 for determining the energy model 616 of the motion control system in accordance with some embodiments of the invention. The energy model can be defined based on energy consumption 730 of components 710 of the system 600. The components 710 include, but are not limited to, the motor and the amplifier of the motion control system. The energy consumption 730 can be measured as an integral of the input energy 725 from utility grid 720. In various embodiments of the invention, the energy model of the motion control system is based on static 716 and dynamic 718 constraints of the components for the system, constraint 714 on the operation of the system, and constraint 712 on energy flow during the operation of the system. Based on an accurate energy consumption model, the motion controller can generate a trajectory. Provided that the motion of a motor follows that trajectory, the energy consumption of a motion control system is effectively reduced.

For example, the dynamic constraint 718 includes consideration of dynamics of the motor of the motion control system. The dynamics of the motor can be defined according to $$\begin{bmatrix} \dot{x}_1 \\ \dot{x}_2 \end{bmatrix} = \begin{bmatrix} 0 & 1 \\ 0 & d \end{bmatrix} \begin{bmatrix} x_1 \\ x_2 \end{bmatrix} + \begin{bmatrix} 0 \\ b \end{bmatrix} u + \begin{bmatrix} 0 \\ c \end{bmatrix}$$

where $x=(x_1, x_2)$ ($\theta$, $\omega$) is a state of the motor state representing a position of the motor position and an angular velocity respectively, u is the control input to the motor, d, c are the viscous and Coulomb friction coefficients of the motor, respectively, b is a constant coefficient, a single dot indicates the first derivative, and double dots the second derivate, $x_2$ is a second component of the state of the motor x representing an angular velocity of the motor. The embodiment of the control input to the motor depends on the type of the motor. In one embodiment, the control input to the motor includes a current input into the motor. Additionally or alternatively the control input can include control signal of a voltage into the motor.

Generally, the gross energy consumption of a motion control system includes copper losses and iron losses, switching losses of an amplifier, and a mechanical work required for positioning the load. The mechanical work is influenced by the operational constraint 714. For example, the operational constraint 714 can include a size and/or a shape of a load, a distance of a relocation of the load, and other conditions of the operation of the motion control system.

The copper losses are due to the flow of current through the stator windings of the motor and can be defined according to $Ru^2$, where R is the resistance of windings of the motor and is usually supplied by a manufacture of the motor. The iron losses are result from eddy currents and hysteresis, which can be approximated according to $K_e\omega^2 u^2 + K_h|u|^\gamma \omega$, where $K_e$ and $K_h$ are constant coefficients of the eddy currents and the hysteresis losses of the motor, and $\gamma$ is the Steinmetz constant. The Steinmetz constant as well as the hysteresis and eddy current constants can be determined, e.g., using curve fitting from the data provide by manufacturer of the motor.

The losses in the amplifier, e.g., a pulse-width-modulation amplifier, include switching losses, conduction losses, and gate drive losses. For example, the switching losses can be determined according to $K_s|u|$, where $K_s$ is a constant coefficient of the switching loss.

The mechanical work can be modeled according to $K_t \omega u$, where $K_t$ is the torque constant of the motor, and $\tau=K_t u$, and $\tau$ is the torque generated by the motor. The torque constant is usually supplied by the manufacture of the motor.

Hence, one embodiment of the invention describes the energy consumption 730 of the motion control system according to the following model 616

$P(x,u) = Ru^2 + \{K_e x_2^2 u^2 + K_h|x_2||u^\gamma|\} + K_s|u| + K_t u x_2$.

Some embodiments of the invention consider the energy flow constraint 712 to determine the energy model 616. For example, when P(x,u)>0, the motion control system takes the energy from the utility grid. On the other hand, the mechanical work can be converted into energy by the motor and can flow back to the grid or be dissipated by the brake chopper. One embodiment uses the energy flow constraint requiring the brake chopper to dissipate the negative power P(x,u) Alternative embodiment uses the energy flow constraint requiring the energy to return from the motion control system back to the utility grid.

For example, in a more complex case, when the energy is not returned back to the grid, the energy model 616 is determined according to $$Q(x(t), u(t)) = \begin{cases} P(x(t), u(t)), & P(x(t), u(t)) > 0, \\ 0, & P(x(t), u(t)) \leq 0, \end{cases}$$

The establishment of an energy consumption model, which accurately captures the characteristics of the actual energy consumption of a motion control system is critical to implement an energy efficient motion control system.

Figure 7B:
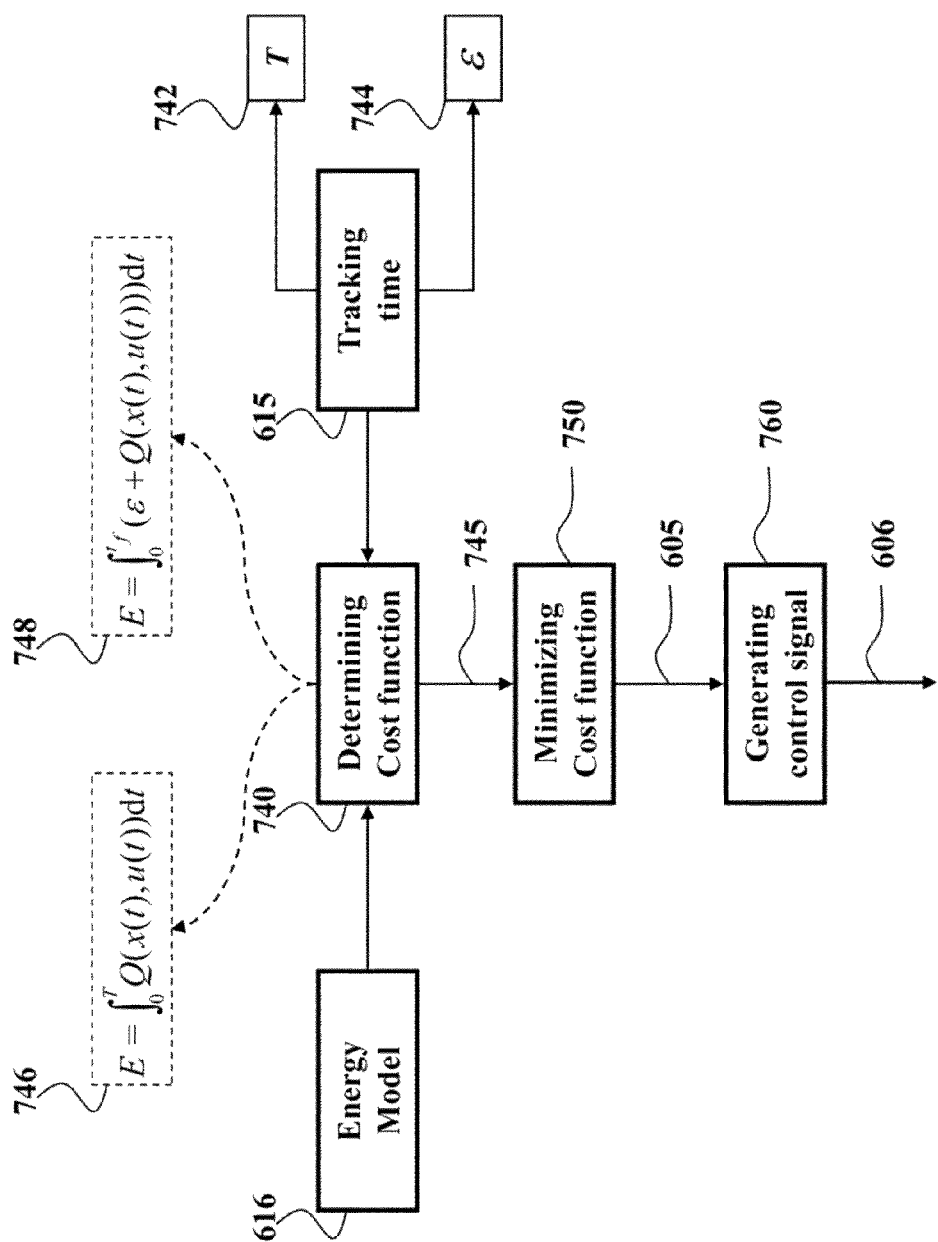

FIG. 7B shows a block diagram of a method for determining the control signal 106 according to some embodiment. The cost function 745 is determined 740 based on the energy model 616 and based on a function 615 of the tracking time.

In one embodiment the function of the tracking time is a tracking time T 742 at which the load has to be position into a desired position. For example, the tracking time can be provided by the user of the motion control system. The cost function 745 for the energy consumed by the motion control system over the tracking period T can include an integral 746 of the gross energy consumption according to $$E = \int_0^T Q(x(t), u(t))dt. \quad (1)$$

In some embodiments, the energy model is modified according to variation in implementations of the motion control system. For example, the energy consumption of a small scale motion control system can be approximated based on only the resistive loss. In this embodiment, the energy model can be represented as a quadratic function of control.

After the energy model and the cost function are defined, the embodiments minimize 750 the cost function 745 to determine the energy-efficient trajectory 605. Consequently, the trajectory generated by minimizing a cost function can obtain a good energy efficient motion control system. In some embodiments, when the cost function and the constraints exactly depict the properties of a motion control system, an energy optimal motion control system is resulted. The cost function can be used to make the tradeoff between energy consumption and tracking time. For example, in one embodiment, the cost function is defined by Equation (1). Thus, the tradeoff between energy consumption and tracking time is achieved by varying the tracking time T, which can be specified by a user through a user interface.

In alternative embodiment, the function 115 of tracking time is represented a tradeoff between the tracking time and the energy consumption. For example, the cost function is determine as an integral 746 according to $$E = \int_0^{t_f} (\varepsilon + Q(x(t), u(t)))dt,$$

where the tracking time $t_f$ is unspecified, and $\varepsilon$ 744 is a preference constant, which can be introduced by a user. A large value of the preference constant $\varepsilon$ represents the importance of the tracking time of the operation of the motion control system, i.e., productivity of the system, over the energy efficiency. A small value of the preference constant $\varepsilon$ means the opposite, i.e., reflects importance of the energy efficiency over the tracking time.

The current disclosure describes the embodiments based on the cost function according to Equation (1). Its extension to different cost functions is straightforward to those skilled in the art.

Some embodiments of the invention consider physical limitation of a design of the motion control system. Typical motion control system is subject to a number of constraints, such as static 716 and dynamic 718 constraints. The static constraint 716 includes an acceleration constraint, a velocity constraint, and an input current constraint of the motor. The dynamic constraint 718 represents dynamics of the motor. The constraints 719 include at least some of the static and the dynamic constraints, the non-convex spatial constraints, the tracking time, and an initial and a final state of the motor. The consideration of constraints in the trajectory generation can remove the limitations introduced by the ignorance of constraints in the design stage, thus improves the energy efficiency of a motion control system.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer-readable medium or multiple computer readable media, e.g., a computer memory, compact discs (CD), optical discs, digital video disks (DVD), magnetic tapes, and flash memories. The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for optimizing a trajectory for a motion of a manipulator avoiding at least one obstacle, comprising:

determining a cost function representing the motion of the manipulator from an initial position to a final position, wherein an optimization of the cost function is subject to spatial non-convex constraints due to avoidance of a region of the obstacle located between the initial position and the final position;

selecting a set of locations on the trajectory representing positions of the manipulator at different times;

determining, for each location in the set of locations, at least one linear convex constraint defining an interval of values for a projection of a position of the location on an axis of a direction of the motion of the manipulator to produce a set of linear convex constraints; and optimizing the cost function subject to the set of linear convex constraints to optimize the trajectory, wherein steps of the method are performed by a processor.

2. The method of claim 1, further comprising:

updating the set of locations on the optimized trajectory for different positions of the manipulator; and repeating the determining and the optimizing steps, until a termination condition is reached.

3. The method of claim 1, wherein the direction of the motion of the manipulator is defined by a direction of a motor of the manipulator, wherein the manipulator is controlled by multiple motors along multiple directions of the motion, further comprising:

determining, for each location, the linear convex constraints for each direction of the motion; and optimizing the cost function subject to the linear convex constraints for each direction of the motion.

4. The method of claim 1, further comprising:

initializing the trajectory with a collision-free initial trajectory.

5. The method of claim 4, further comprising:

determining a cost function representing the motion of the manipulator from an initial position to a final position within a time of operation; and minimizing the cost function top produce the initial trajectory minimizing time of the operation.

6. The method of claim 1, further comprising:

determining a set of collision-free initial trajectories;

determining the set of linear convex constraints for each initial trajectory;

optimizing each initial trajectory subject to a corresponding set of the linear convex constraints to produce a set of optimal trajectories; and selecting a global optimal trajectory from the set of optimal trajectories.

7. The method of claim 6, further comprising:

determining the set of initial trajectories by optimizing a simplified cost function including a shortest moving time cost function or a quadratic function of decision variables.

8. The method of claim 1, wherein the optimizing is performed iteratively until a termination condition is satisfied.

9. The method of claim 1, wherein the cost function includes electric and mechanical losses of the manipulator describing an energy consumption of the manipulator.

10. The method of claim 1, further comprising:

decomposing a working environment of the manipulator into separate regions including a convex region with convex constraints and a non-convex region with non-convex constraints, wherein the set of liner convex constraint is determined for the non-convex region only; and optimizing jointly the cost function subject to convex constraints of the convex region and the set of liner convex constraints of the non-convex region.

11. A system for determining a trajectory for a motion of a manipulator avoiding at least one obstacle, comprising a processor for:

initializing the trajectory with a collision-free initial trajectory;

selecting a set, of locations on the trajectory representing positions of the manipulator at different times;

determining, for each location in the set of locations, a locally convex constraint to produce a set of locally convex constraints; and optimizing a cost function representing the motion of the manipulator subject to the set of locally convex constraints to optimize the trajectory.

* * * * *